United States Patent

Byk

[11] Patent Number: 5,884,431
[45] Date of Patent: Mar. 23, 1999

[54] LANDSCAPING MAINTENANCE DEVICE

[76] Inventor: Andrew N. Byk, 10 Narcissus Rd., Middlebury, Conn. 06762

[21] Appl. No.: 921,547

[22] Filed: Sep. 2, 1997

[51] Int. Cl.$^6$ .......................... A01G 13/10; A01G 29/00
[52] U.S. Cl. ................................................. 47/25
[58] Field of Search ............ 47/25, 33, 1.01 R, 47/62, 63, 64, 48.5, 79, DIG. 10

[56] References Cited

U.S. PATENT DOCUMENTS

| | | | |
|---|---|---|---|
| 2,782,561 | 2/1957 | Smith | 47/33 |
| 4,049,059 | 9/1977 | Weibling | 172/15 |
| 4,268,992 | 5/1981 | Scharf, Sr. | 47/25 |
| 4,336,666 | 6/1982 | Caso | 47/48.5 |
| 4,665,645 | 5/1987 | Schau, III et al. | 47/25 |
| 4,685,246 | 8/1987 | Fennell | 47/66 |
| 5,142,818 | 9/1992 | Weigert | 47/48.5 X |
| 5,172,517 | 12/1992 | Thomsen | 47/83 |
| 5,291,708 | 3/1994 | Johnson | 47/33 X |
| 5,333,391 | 8/1994 | Eldridge et al. | 33/760 |
| 5,692,338 | 12/1997 | Rose | 47/48.5 |

*Primary Examiner*—Thomas Price
*Attorney, Agent, or Firm*—David L. Volk

[57] ABSTRACT

A hollow, substantially conical container has an open end and a closed end. This container is perforated in order to allow liquid to freely pass through it. Attached to the closed end of the container, and coaxial with the container itself, is an inflexible, elongated portion. This portion forms a point at the distal end in order to facilitate ground penetration. A substantially flexible, planar, elongated element has a first end and a second end, and includes an attachment device for firmly connecting the ends, thereby forming a cincture. At least one conical container is connected to the elongated element.

4 Claims, 2 Drawing Sheets

LANDSCAPING MAINTENANCE DEVICE

BACKGROUND OF THE INVENTION

1. Field of the Invention

This invention relates to lawn and garden supplies. More particularly, it relates to trimming and fertilizing devices.

2. Description of the Related Art

There is no product in the area of lawn and garden maintenance that contains mulch in a predetermined area while simultaneously fertilizing the surrounding plants. There are devices on the market which keep mulch or stone contained within a specified area. There are also a number of ways to deliver fertilizer to the roots of a plant; however, none of the existing devices accomplish both of these goals in what is essentially one system. Further, no existing devices comprise a subterranean fertilizer delivery system. What is needed is a system whereby mulch and other weed discouraging materials can be restrained in a closed area, while, at the same time, allowing fertilizer to be gradually delivered to the growing plant.

SUMMARY OF THE INVENTION

The landscaping maintenance device of the present invention includes a hollow, substantially conical container that has an open end and a closed end. This container, which is designed to hold pellets of fertilizer, is perforated in order to allow water to freely pass through it and deliver dissolved fertilizer to the surrounding soil. Attached to the closed end of the container, and coaxial with the container itself, is an inflexible, elongated portion. This portion forms a point at the distal end in order to facilitate ground penetration. A substantially flexible, planar, elongated element has a first end and a second end, and includes an attachment means for firmly connecting the ends, thereby forming a cincture. At least one conical container is connected to the elongated element via an attachment device.

Because the container is perforated, fertilizer is more easily delivered to the roots of surrounding plants. Because the elongated element has connecting ends, it can be joined to form a cincture in order to keep rocks or mulch located about the base of a tree, for example. This has the effect of discouraging weed growth, while ensuring fertilizer delivery to the roots of the plant. The ends can also be disconnected, thereby allowing a long strip of the devices to be used along the edge of a flowerbed, for example. Because any number of fertilizer containers may be attached to the elongated element, different fertilizer quantities may be delivered to a particular area.

Still further features and advantages will become apparent from the ensuing description and drawings.

DETAILED DESCRIPTION

Figure 1:
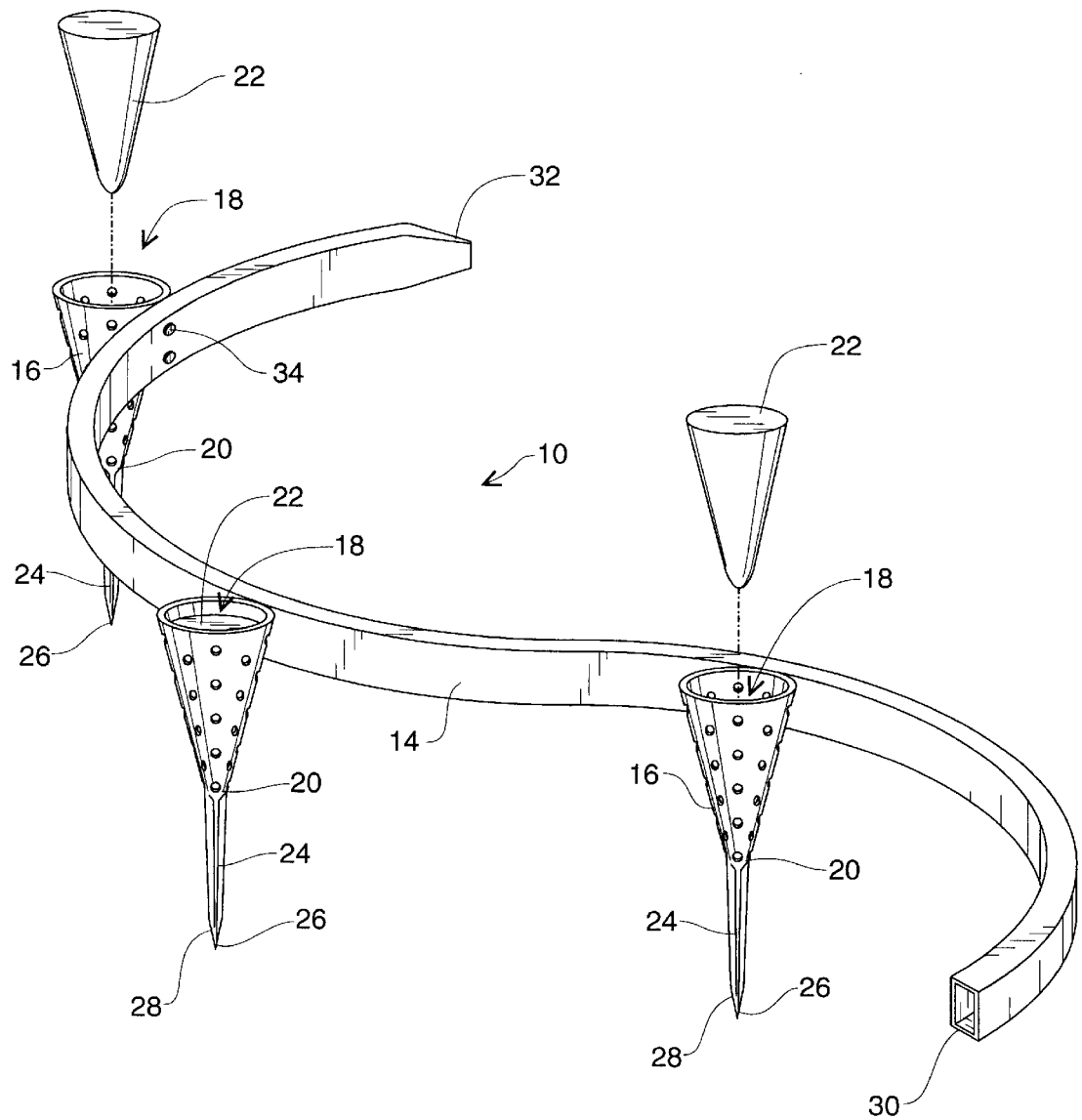
FIG. 1 is a perspective view of the landscaping maintenance device of the present invention with the ends of the elongated element disconnected.

FIG. 1 is a perspective view of the landscaping maintenance device 10 of the present invention. The device 10 includes a hollow, substantially conical container 16 that has an open end 18 and a closed end 20. This container 16, which is designed to hold pellets of fertilizer 22, is perforated in order to allow water to freely pass through it and deliver dissolved fertilizer to the surrounding soil. Attached to the closed end 20 of the container 16, and coaxial with it, is an inflexible, elongated portion 24. This portion forms a point 26 at the distal end 28 in order to facilitate ground penetration.

Figure 2:
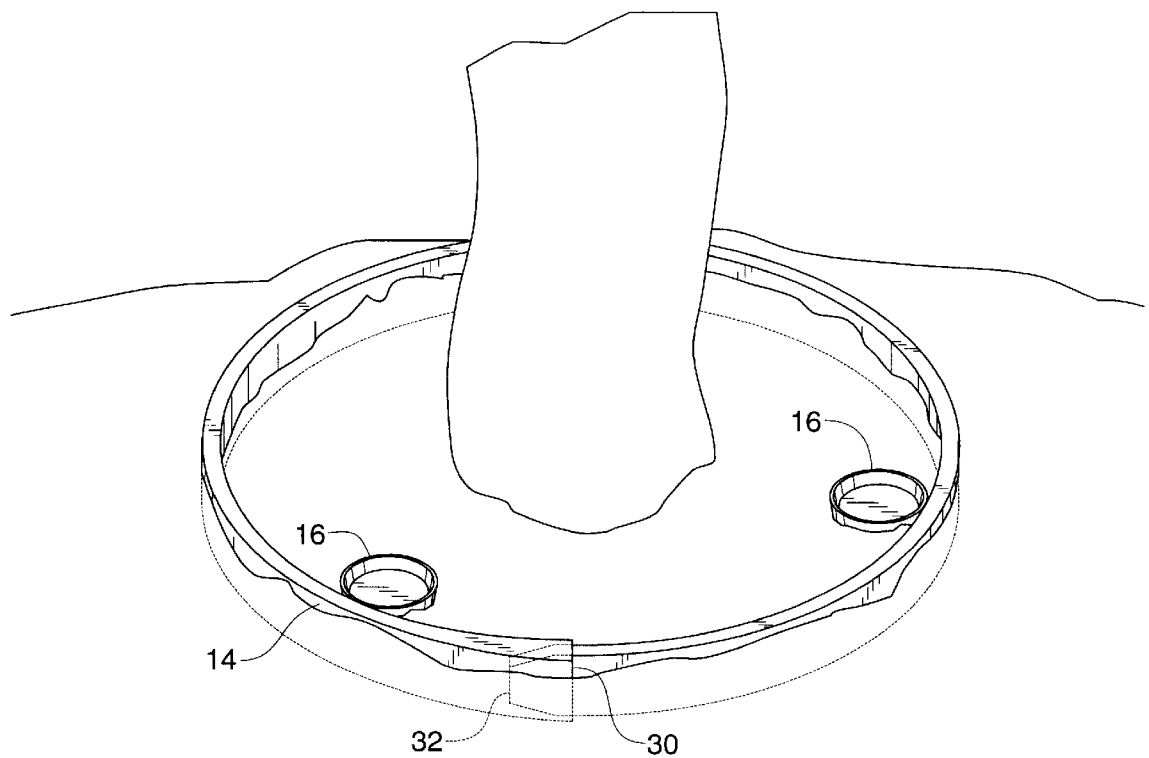
FIG. 2 is a perspective view of the landscaping maintenance device of the present invention, in use as a cincture.

Referring to both FIG. 1 and FIG. 2, a substantially flexible, planar, elongated element 14 has a first end 30 and a second end 32. The second end 32 is configured to conformingly fit within the first end 30, for firmly connecting the first end 30 to the second end 32, thereby forming a cincture. Other known methods of providing this connection are possible. At least one conical container 16 is connected to the elongated element 14 via any known means, such as pins 34.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. For example, the conical containers 16 could be provided without the elongated element 14. Of course, such an embodiment would lack the benefits of a trimming device or cincture which are provided by the elongated element 14. Further, the conical containers 16 could be made to be removably attachable to the elongated element 14. Accordingly, the scope of the invention is to be limited only by the following claims and their legal equivalents.

The invention claimed is:

1. A landscaping maintenance device comprising:
   a. a fertilizer delivery apparatus comprising a hollow, substantially conical, perforated container having an open first end adapted to receive fertilizer there-through, and a second end disposed opposite the first end;
   b. a substantially inflexible, elongated member fixedly attached to the second end and substantially coaxial with the conical container, said member substantially forming a point at a distal end thereof to facilitate ground penetration;
   c. an elongated element being bendable from a substantially straight configuration to a circular configuration; and
   d. a connecting means for attaching the delivery device to the elongated element.

2. The device of claim 1, wherein the elongated element further includes an attachment means for affixing a first end of the elongated element to a second end of the elongated element, thereby forming a cincture.

3. A landscaping maintenance device comprising:
   a. a hollow, substantially conical perforated container having an open first end adapted to receive fertilizer there-through, and a second end disposed opposite the first end;
   b. a substantially inflexible, elongated member fixedly attached to the second end and substantially coaxial with the conical container, said member forming a point at a distal end thereof to facilitate ground penetration;
   c. a substantially flexible, planar, elongated element having a first end and a second end, said element further including an attachment means for affixing the first end to the second end, thereby forming a cincture;
   d. a connector for attaching the conical container to the elongated element; and e. the elongated element being bendable from a substantially straight configuration to a circular configuration, whereby the element is adapted to be placed about a base of a tree, and alternatively along an edge of a flower bed.

4. A landscaping maintenance device comprising:

a. a hollow perforated container having an open first end adapted to receive fertilizer there-through, and a second end disposed opposite the first end;

b. a substantially flexible, planar, elongated element having a first end and a second end, said element further including an attachment means for affixing the first end to the second end, thereby forming a cincture;

c. a connector for attaching the conical container to the elongated element; and d. the elongated element being bendable from a substantially straight configuration to a circular configuration, whereby the element is adapted to be placed about a base of a tree, and alternatively along an edge of a flower bed.

* * * * *